United States Patent [19]

Harrison

[11] 4,004,321
[45] Jan. 25, 1977

[54] CRAB MEAT EXPRESSING MACHINE AND METHOD

[76] Inventor: George H. Harrison, 817 Jefferson Ave., Newport News, Va. 23607

[22] Filed: Mar. 28, 1975

[21] Appl. No.: 563,218

[52] U.S. Cl. .................................. 17/48; 17/71
[51] Int. Cl.$^2$ .................................. A22C 29/00
[58] Field of Search ............ 17/71, 48, 73, 52; 99/567, 574, 577, 578, 585, 587, 579; 426/480, 482

[56] References Cited

UNITED STATES PATENTS

| | | | |
|---|---|---|---|
| 2,335,806 | 11/1943 | Sjostrom | 17/71 |
| 2,663,897 | 12/1953 | Greiner et al. | 17/71 |
| 2,712,152 | 7/1955 | Samanie | 17/48 |
| 3,203,039 | 8/1965 | Glidden et al. | 17/71 |
| 3,359,595 | 12/1967 | Anderson et al. | 17/71 |
| 3,596,310 | 8/1971 | Tolley | 17/71 |
| 3,696,465 | 10/1972 | Rossnan | 17/48 |

Primary Examiner—Louis G. Mancene
Assistant Examiner—James D. Hamilton

[57] ABSTRACT

Halves of cleaned crabs, claws off and fins on, are placed onto the upper run of a conveyor belt with the fins facing in the direction of travel. A cooperating belt disposed above the conveyor belt has a lower run converging towards the upper run of the conveyor belt to form a squeeze pass therebetween, which squeezes the meat from the shell onto the belt in the rearward direction of belt travel. Rollers spaced beyond the ends of the belt run grab the fins in their nip and pull the then empty shell away from the belt run and the expressed crab meat drops off the end of the conveyor belt run into a container.

18 Claims, 3 Drawing Figures

U.S. Patent  Jan. 25, 1977  4,004,321
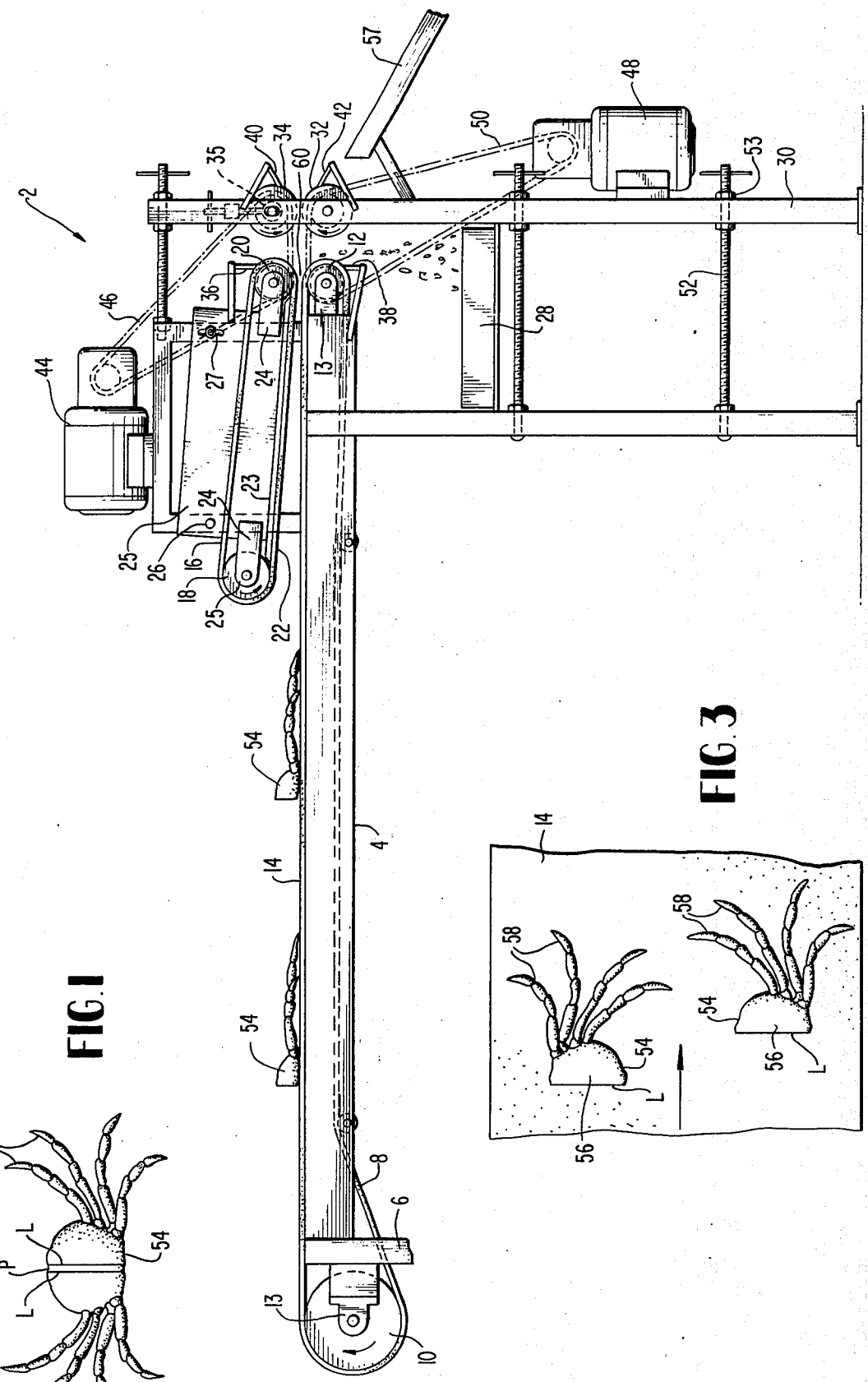
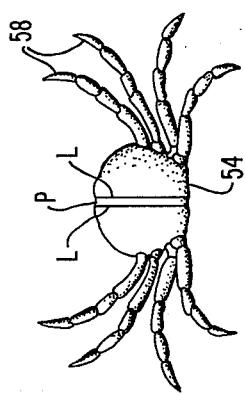
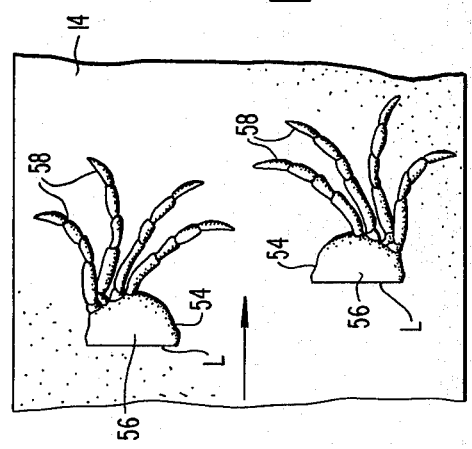
FIG.1
FIG.2
FIG.3

CRAB MEAT EXPRESSING MACHINE AND METHOD

FIELD OF INVENTION

Butchering, Crustaceans, and Shelling.

PRIOR ART

Rollers for expressing meat from king crab legs, exemplified by Anderson et al U.S. Pat. No. 3,149,371; centrifugal extracting machines, sucking machines, cracking and floatation separation of meat and shells, and machines wherein meat is extruded from shells in molds.

OBJECTS

Of the various types of crab meat picking or extracting machines and processes, none has been truly successful, either because they are too complex, too hard to keep sanitary, or too expensive, and, in most instances, they fail to extract a sufficiently high percentage of available meat and leave intolerable amounts of shell and/or briney residue in the meat.

The roller type of machines which express meat from king crab legs or claws are satisfactory because the leg meat is relatively firm and does not tenaceously adhere to the shells. Rollers are unsatisfactory for crabs of the type found on the East and Gulf Coasts of the United States (and elsewhere), such as the so-called "blue crab", because their meat is relatively soft and somewhat sticky. The object now is to provide a machine which will gradually express the meat from a half of a crab in the direction towards the open end of the half crab body, i.e., the center which is left exposed when the crab is cut in half; and a further object is to provide for pulling the then-empty shell away from the expressed meat.

These and other objects will be apparent from the following specification and drawing, in which:

FIG. 1 diagrammatically illustrates the severance of a crab body along two parallel lines, one on each side of the central partition;

FIG. 2 is a side elevation of the machine, which also illustrates the method; and, FIG. 3 is a fragmentary plan view showing the disposition of the crab halves on the conveyor belt.

Referring now to the drawings, in which like reference numerals denote similar elements, the crab meat expressing machine 2 consists of an elongate table 4 supported on a suitable frame above the floor as by legs 6. An endless conveyor belt running over rollers 10 and 12 at each end, which rollers have shafts conventionally supported by bearings 13, has its upper run 14 slidably supported on and backed up by the top of table 4. Disposed above the end portion of conveyor belt 8 is an endless squeeze belt 16 whose ends are supported by rollers 18 and 20, and whose lower run 22 converges downwardly toward the end of upper belt run 14. The lower run 22 of belt 16 slides along a back-up plate 24. The shafts of rollers 18 and 20 are conventionally supported by bearings 74 on a chassis 25 on an upper portion of frame 4. One end of chassis 25 is pivoted, as at 26, to the upper portion of frame 4 and the other end is adjustably secured, as by a bolt and curved-slot device 27, so that the nip between the converging ends of belt runs 22 and 14 can be adjusted. Beneath roller 12 is a suitable catching device, such as pan 28.

Supported on an adjustable end portion 30 of the frame and spaced forwardly from rollers 12 and 20 are a pair of rollers 32, 34. The belts 16 and 8 are respectively provided with scrapers 36 and 38, and the rollers 32 and 34 are also provided with scrapers 40 and 42. The shafts for rollers 20 and 34 are driven by a motor 44 via a conventional chain drive 46 and the shafts of rollers 12 and 32 are likewise driven by a motor 48 via a conventional chain drive 50. Disposed beyond the nip of rollers 32 and 34 is a chute 57. In a typical machine, the table, frame, chute and rollers are all made of stainless steel and the belts are made of sanitized rubber which has some resilience so that the shells and crab meat passing between the converging run-ends will not be excessively crushed. The end portion 30 of the frame may be adjusted towards and away from the main portions by rotating threaded rods 52 in nuts 53 affixed to frame portion 30. Roller 34 is adjusted towards and away from roller 60 by a conventional adjusting device 35. The nip between the converging ends of the belt runs may range from zero clearance up to about ¼ inch, depending upon the size of the crabs and also depending upon whether or not they are fully cooked. If the crabs are fully cooked, the clearance may be less than when they are partly cooked. The nip between rollers 32 and 34 may vary between 1/16 inch and ⅛ inch, although dimension is not critical. The roller nip should be narrow enough so that the rollers will grab between them the fins on the crab shell halves as the latter emerge from the nip between the converging ends of the belts. Belts 8 and 16 are driven at the same speed and the rollers 32 and 34 are driven at the same peripheral speed, or slightly faster, than the peripheral speeds of the belts as they pass over rollers 12 and 20.

The crabs whose meat is to be expressed are first cooked, or partly cooked, de-backed, cleaned of their so-called "dead man's fingers", their large claws are removed, and preferably the bodies are cut in half along their fore-and-aft mid-lines by making two cuts, L, L, one on each side of the central partition P which runs fore-and-aft through the center of the crab body, which partition is then removed to expose the back fin pieces in each crab half. Preferably the back fin is removed by hand before the remainder of the meat is expressed because of the great value of intact back fin pieces.

In operation of the machine, the de-backed and cleaned half crabs 54 are placed on upper belt run 14 with their exposed open body cavities 56 facing rearwardly and their fins 58 extending forwardly in the direction of belt travel as indicated by the arrows. As the crab halves move to the right, as seen in FIG. 2, they are first lightly engaged between the upper run 14 of belt 8 and the lower run 22 of squeeze belt 16, and as they progress towards the nip between the converging ends of the belts, the meat is gradually expressed from the open ends of the crab halves. By the time the shells reach the end of the squeeze pass between the belt runs 14 and 22, most of the meat has been expressed from the open ends of the crab halves. As the then virtually empty shells emerge, fins first, from the end of the squeeze pass, the fins are grabbed between rollers 32 and 34 which yank the fins and attached empty shells away from the ends of the belt runs and feed them down a chute 52 to a suitable catching device. The expressed meat moves forwardly over the ends of the belt runs and drops downwardly into a suitable catching device, diagrammatically illustrated as a pan 28. Conventional scrapers 36, 38 are provided for the belts 16 and 8, and likewise conventional scrapers 40 and 42 are provided for rollers 34 and 32.

Although in the foregoing description and in some of the following claims, the removal of the center partition has been described and although this is desirable, it is not necessary. The crab may be cut in half by one stroke of a single knife.

I claim:
1. The method of expressing crab meat from the shell of a half body of an at least partly-cooked crab, wherein the crab has been cleaned, de-clawed, and severed in half along its fore-and-aft mid-line to expose the central cavity of the half body along a substantially vertical section opposite the fin side of the body which comprises;

moving the half body along a path with the exposed section facing contra to the direction of travel and the fin side of the body facing forwardly in the direction of travel, and applying squeezing forces to the body by pressing the same between two opposed surfaces which converge towards one another along substantially straight lines, which forces increase gradually from the fin side towards the exposed section of the body until meat is expressed from the body through the exposed section thereof.

2. The method of expressing crab meat from an at least partly-cooked crab body, wherein the body has been cleaned and de-clawed but wherein the fins are left on, and wherein the crab has been severed in half along its fore-and-aft mid half line to expose the central cavity of the body along a substantially vertical section opposite the fin side of the body, which comprises;

moving the half body along a path with the exposed section facing contra to the direction of travel and the fins facing forwardly in the direction of travel, applying squeezing forces to the body by pressing the same between two convergent surfaces, which forces increase from the fin side of the body towards the exposed section until meat is expressed from the body shell through the exposed section thereof, grasping the fins at a location spaced along said path beyond the point of maximum convergence of the surfaces and pulling them and the attached shell generally in said direction of travel away from the expressed meat.

3. The method of expressing crab meat from the shell of an at least partly cooked, cleaned and de-clawed crab body, which comprises, severing the crab body in half substantially along its fore and aft mid-line to expose the central cavities of the two halves each along a substantially vertical section opposite the fin side thereof, moving the half crab bodies along a path with the exposed sections facing contra to the direction of movement and the fin side of the bodies facing forwardly in the direction of travel, and applying squeezing forces to the bodies by pressing the same between two opposed surfaces which converge towards one another along substantially straight lines, which forces increase gradually from the fin sides towards the exposed middles of the bodies until meat is expressed from the exposed middles thereof.

4. The method recited in claim 3, including the step of removing from the crab body prior to squeezing the halves the central partition which runs fore-and-aft through the crab body.

5. The method recited in claim 4, characterized in that the central partition is removed by making two parallel cuts, one on either side of the central partition.

6. The method of expressing crab meat from the shell of an at least partly-cooked cleaned and de-clawed crab body having the fins thereon, which comprises;

severing the crab body in half substantially along its fore-and-aft mid-line to expose the central cavities of the two halves each along a substantially vertical section opposite the fin side thereof, moving the half crab bodies along a path with the exposed sections facing contra to the direction of movement and the fin sides of the bodies facing forwardly in the direction of travel, applying squeezing forces to the bodies, between two convergent surfaces, which forces increase from the fin side towards the exposed sections thereof until meat is expressed from the bodies through the exposed sections, and grasping the fins at a location spaced along said path beyond the point of maximum convergence of the surface and pulling them and the attached shells generally in said direction of travel away from the expressed meat.

7. The method recited in claim 6, including the step of removing from the crab body prior to squeezing the halves, the central partition which runs fore-and-aft through the crab body.

8. The method recited in claim 7, characterized in that the central partition is removed by making two parallel cuts, one on either side of the central partition.

9. A machine for expressing crab meat from the shells of half bodies of crabs, comprising a pair of endless belts having elongate runs disposed opposite of one another and converging along substantially straight lines towards a nip between end portions thereof and defining therebetween a squeeze pass which decreases in width, as measured between the belts, gradually towards said nip, means for driving said belts in the direction which moves them along their converging runs towards said nip and pressure-resistant means for maintaining said runs along said substantially straight lines.

10. A machine as defined in claim 9, and means disposed beyond the converging ends of said belt runs for grasping and pulling away from the converging ends of the belt runs material emerging for a pre-determined distance beyond said nip.

11. A machine as defined in claim 10, said means comprising a pair of rollers, and means for driving said rollers.

12. A machine as claimed in claim 11, and means for adjusting the nip between the converging ends of the belt runs.

13. A machine as defined in claim 12, and means for adjusting the nip between the rollers.

14. A machine as defined in claim 13, and means for adjusting the distance between the rollers and the converging ends of the belt runs.

15. A machine as defined in claim 14, said belts being formed of resiliently yieldable material.

16. A machine for expressing meat from the shells of half bodies of crabs, comprising a first frame portion having a generally flat top surface, a first endless flat conveyor belt having a substantially straight upper run, means for supporting said first conveyor belt with the upper run slidably supported on the top surface of the frame, a second endless flat conveyor belt having a lower run, means for supporting the second belt with its lower run disposed above the upper run of the first and converging along a substantially straight line towards an end of the first belt run and defining therebetween an elongate squeeze pass which decreases in width gradually towards a nip between the convergent ends thereof, and means for driving said belts so that they move along said runs towards said nip, means spaced from said nip for engaging material emerging therefrom and pulling it away from the converging ends of said belts and pressure-resistant means for maintaining said runs along said substantially straight lines.

17. A machine as claimed in claim 16, the last-named means comprising a pair of rollers and means for driving said rollers.

18. A machine as claimed in claim 17, a second frame portion movable towards and away from the first frame portion, said rollers being supported on said second frame portion, and means for adjusting the second frame portion towards and away from the first frame portion.

* * * * *